United States Patent
Windorf

[11] 3,775,226
[45] Nov. 27, 1973

[54] SOLAR CONTROL FILM
[75] Inventor: Michael E. Windorf, Malden, Mass.
[73] Assignee: Material Distributors Corporation, Woburn, Mass.
[22] Filed: Feb. 8, 1971
[21] Appl. No.: 113,426

[52] U.S. Cl. ............................. 161/4, 161/1, 161/6, 161/167, 161/406, 350/1, 156/99, 161/165
[51] Int. Cl. ....................... B44f 1/100, A61l 15/06
[58] Field of Search ....................... 350/1, 316, 166, 350/164; 156/99, 100; 161/1, 4, 6, 167, 165

[56] References Cited
UNITED STATES PATENTS
| | | | |
|---|---|---|---|
| 2,882,183 | 4/1959 | Bond et al. | 161/167 |
| 3,073,734 | 1/1963 | Bemmels | 161/167 |
| 3,681,179 | 8/1972 | Theissen | 161/4 |
| 3,069,301 | 12/1962 | Buckley et al. | 156/99 |
| 3,398,040 | 8/1968 | Allen et al. | 350/1 |
| 3,170,833 | 2/1965 | Noyes | 161/6 |
| 3,410,625 | 11/1968 | Edwards | 350/1 |
| 3,499,697 | 3/1970 | Edwards | 156/99 |
| 3,429,733 | 2/1969 | Wolf et al. | 161/1 |

Primary Examiner—George F. Lesmes
Assistant Examiner—R. J. Roche
Attorney—Morse, Altman & Oates

[57] ABSTRACT

A solar control film for application to window glass comprises a vapor deposited aluminum coat, which partially transmits light, interposed between a pair of moisture permeable polymeric strata, each of which is self supporting. In one modification, an optional outer coat on one of the polymeric strata is composed of a pressure sensitive adhesive in association with a silicone release sheet. In another modification, an optional outer coat on the other of the polymeric strata is composed of a silicone release agent.

2 Claims, 4 Drawing Figures

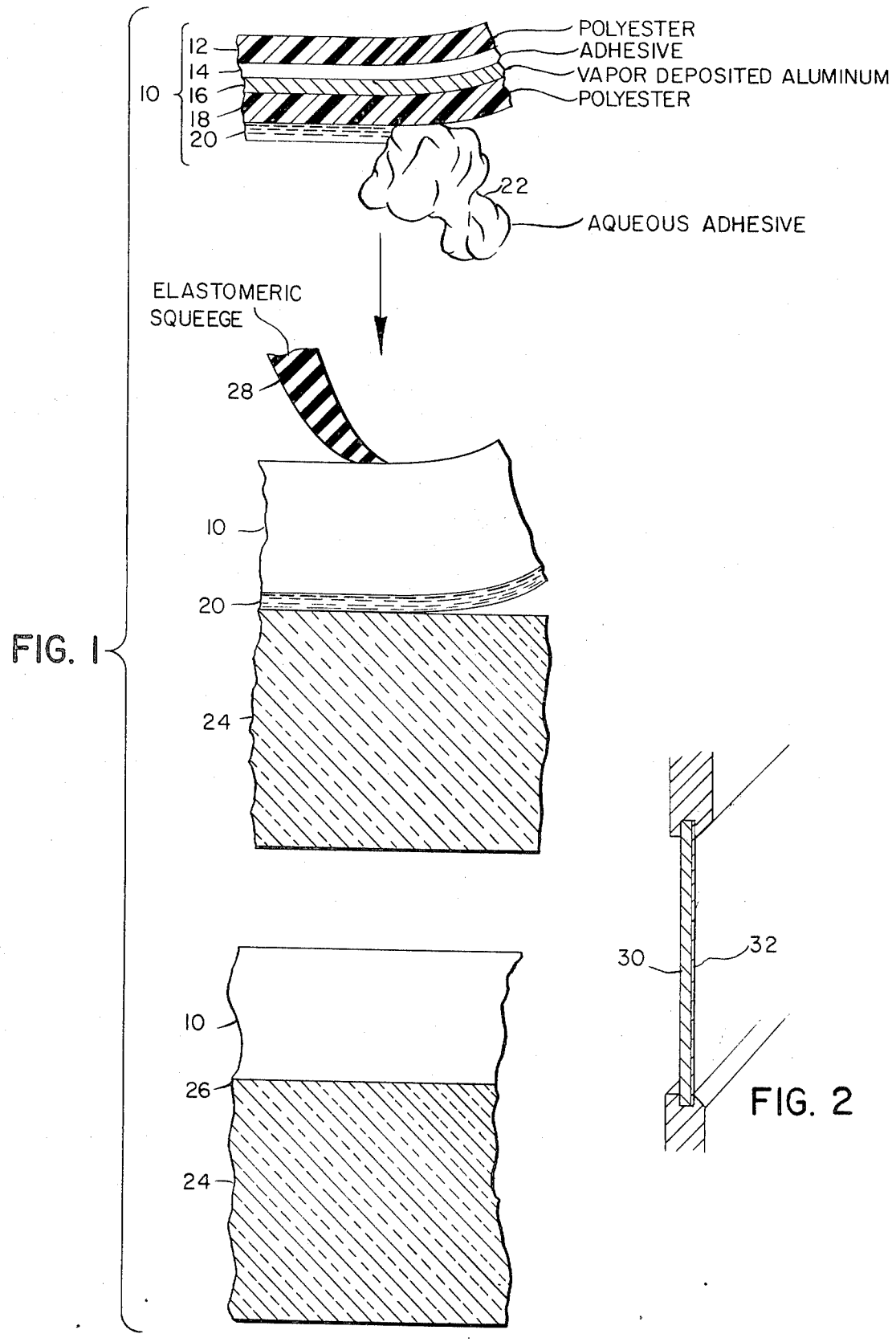

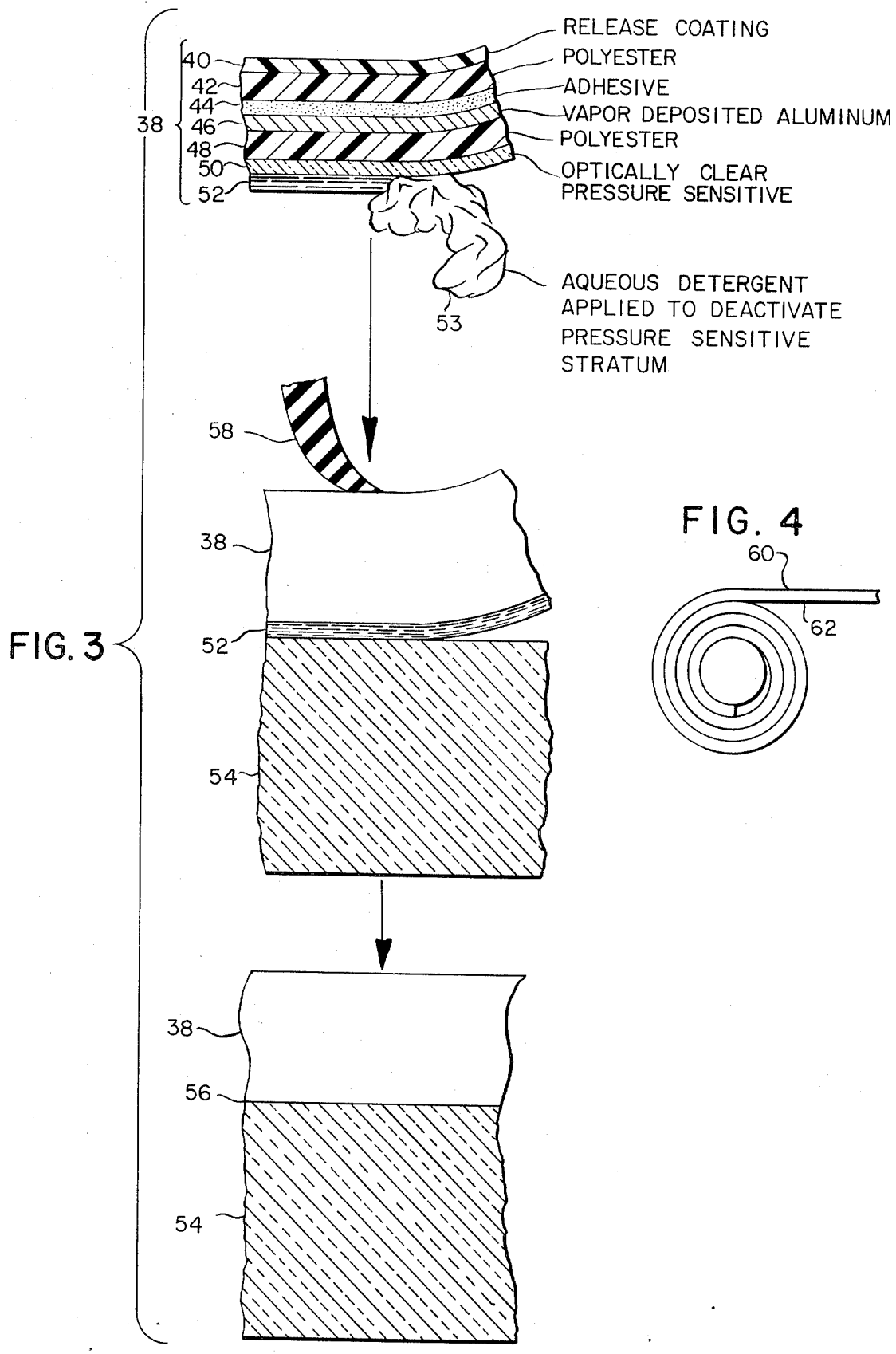

SOLAR CONTROL FILM

BACKGROUND AND SUMMARY

The present invention relates to a solar control film to be applied to windows in order to reduce transmission therethrough of infrared, visible and ultraviolet radiation from the sun. Reduction of infrared transmission limits interior heating in the summer and interior cooling in the winter. Reduction of visible light transmission limits uncomfortable glare. And reduction of ultraviolet transmission limits fabric fading and finish cracking of furniture. Solar control film is intended to reflect solar infrared and ultraviolet and still to permit excellent visibility with minimum distortion. It has been found that 100 square feet of such film has a comparative cooling capacity equal to more than one ton of air conditioning. In effect this film is a two way thermal insulation that is partially transparent. Difficulties have been encountered in storing such films compactly and in laminating and maintaining such films in superposition on windows.

A typical prior solar control film comprises a polymeric sheet, a vapor deposited aluminum coat, a protective polymeric coat, and a pressure sensitive coat, which is deactivated initially by the presence of an agent that eliminates tack during storage, as well as during the time the film is being applied to a window. Just before the film is applied to the window, the pressure sensitive adhesive coating is subjected to water, in consequence of which the agent is dissolved and the pressure sensitive adhesive is reactivated to produce a final bond when dry. When moistening the pressure sensitive adhesive, the water is intended to wash away all of the water soluble agent. But, this washing step is never complete so that some agent always remains. In consequence, the bond between the film and the window can be ruptured when ambient moisture permeates into the interface between the film and the window. Another drawback of this structure is that the protective polymeric coat tends to crack, ripple and rupture whereby deterioration of the aluminum coat occurs.

The primary object of the present invention is to provide a solar control film comprising a vapor deposited aluminum coat, which is of a thickness characterized by a light transmission of 5 to 50 percent, interposed between a pair of moisture permeable polymeric strata, each of which ranges in thickness from one fourth to 1 mil so as to be individually self supporting. It has been found that the self supporting strata eliminate physical and chemical degradation that typically occurs at the vapor deposited aluminum coat in prior systems. In one modification of the solar control film, an optional integral outer coat on one of the polymeric strata is composed of a pressure sensitive adhesive in association with a discrete silicone release sheet. In another modification, an optional integral outer coat on the other of the polymeric strata is composed of a silicone release agent. In such modifications, storage in roll form is permitted by the incompatibility of the pressure sensitive adhesive and the silicone release agent, application to the window glass is enabled by a water compatible de-tackifier which is applied to the pressure sensitive adhesive, and permanent implacement is achieved by permeation of the water compatible de-tackifier through the film and via the edges.

Other objects of the present invention will in part be obvious and will in part appear hereinafter.

The invention accordingly comprises the products and processes, together with their components, steps and interrelationships, which are exemplified in the accompanying disclosure, the scope of which will be indicated in the appended claims.

BRIEF DESCRIPTION OF THE DRAWINGS

For a fuller understanding of the nature and objects of the present invention, reference is made to the following detailed description, taken in connection with the accompanying drawings, wherein:

FIG. 1 is a flow diagram illustrating a solar control film, in exaggerated cross section, undergoing a process of the present invention;

FIG. 2 illustrates an architectural window incorporating the present invention;

FIG. 3 is a flow diagram illustrating an alternative solar control film, in exaggerated cross section, undergoing a process of the present invention; and FIG. 4 illustrates the solar control film of the present invention rolled for storage and transport.

DETAILED DESCRIPTION

Generally, the solar control film of FIG. 1 comprises, in laminated sequence, a moisture permeable polymeric stratum 12, a bonding stratum 14, a vapor deposited aluminum stratum 16, and a moisture permeable polymeric stratum 18. All of these strata except the aluminum stratum are optically clear and transparent. The aluminum stratum is optically clear and partially radiation transmitting, partially radiation absorbing and partially radiation reflecting. Typically: moisture permeable polymeric strata 12 and 18 are composed of a polyester such as that sold under the trademark Mylar a polyester terephthalate, by Dupont; vapor deposited aluminum stratum 16 is produced by controlled density, vacuum vapor deposition upon the surface of polymeric stratum 18; and adhesive bonding stratum 14 is coated upon either vapor deposited aluminum stratum 16 or polymeric stratum 12 as a thin film immediately before superposing the polymeric films and causing the adjacent surfaces to adhere. Typically, polymeric strata 12 and 14 each ranges in thickness from one-fourth to 1 mil, preferably being approximately one-half mil, adhesive stratum 14 ranges in thickness from 0.0001 to 0.0003 inch preferably being approximately 0.0002 and vapor deposited aluminum stratum 14 is characterized by a visible light transmission of 5 percent to 60 percent, having a thickness of no more than 300 angstrom units. Adhesive stratum 14 is cast from a ketonic and/or alcoholic solution of a thermosetting polyester or acrylate ester, the solution preferably being applied to the clear film prior to superposing of the two polymeric films in the formation of the final product. For example, the polyester is Mylar, the acrylic is a methyl and/or ethyl methacrylate, the ketone is methyl ethyl ketone and the alcohol is toluol. The resulting film has a pleasant, soft grey color that permits excellent visibility.

As shown in FIG. 1, an aqueous solution of an adhesive 20 is applied to stratum 18 during application of solar control film 10 to a window 24. During superposition of the solar control film upon window 24, the adhesive serves as a lubricant to permit smoothing of the film and elimination of air pockets between the film and the window by means of a squeegee 28. Following application of the film to the window, the water of the adhesive diffuses through the film and the edges of the interface between the film and the window. In other words, preferably all of the strata of the film are selected for their vapor permeability.

In one form, stratum 12 is composed of a weatherable, ultraviolet light absorbing polymer effective in the range of from 200 to 380 nanometers, that does not darken or decompose upon prolonged exposure to intense ultraviolet. For example, such as polymer is a weatherable polyester containing, as an ultraviolet absorbent, a dispersed substituted benzophenone of the type sold by Antara Chemicals under the trademark Uvinul. FIG. 3 illustrates an architectural glass window 34, the exterior surface of which is laminated to a solar control film 32, of which stratum 18 is contiguous with and stratum 12 is remote from window 34.

Generally, the solar control film of FIG. 4 comprises, in laminated sequence, a release stratum 40, a moisture permeable polymeric stratum 42, a bonding stratum 44, a vapor deposited aluminum stratum 46, a moisture permeable polymeric stratum 48, and a pressure sensitive adhesive stratum 50. All of these strata except the aluminum stratum are optically clear and transparent. The aluminum stratum is optically clear and partially radiation transmitting, partially radiation absorbing, and partially radiation reflecting. Typically: release stratum 40 is composed of a silicone; moisture permeable polymeric strata 42 and 48 are composed of a polyester such as that sold under the trademark Mylar by Dupont; vapor deposited aluminum stratum 46 is produced by controlled density vacuum vapor deposition upon the surface of polymeric stratum 48; adhesive bonding stratum 44 is coated upon either vapor deposited aluminum stratum 46 or polymeric stratum 42 as a thin film immediately before superposing the polymeric films and causing the adjacent surfaces to adhere; and pressure sensitive adhesive 50 is composed of a mixture of synthetic and natural rubbers, e.g., neoprene and latex, a tackifier such as terpene, and an organic solvent such as toluene. Typically, release stratum 40 has a thickness ranging from 0.0001 to 0.001 inch preferably being 0.0005 inch, polymeric strata 42 and 44 each has a thickness ranging from one fourth to 1 mil, preferably being one half mil, adhesive stratum 44 has a thickness of ranging from 0.0001 to 0.0003 inch, preferably being 0.0002 inch, vapor deposited aluminum stratum 44 is characterized by a light transmission of 5 percent to 60 percent and has a thickness of no more than 300 angstrom units, and pressure sensitive adhesive stratum 20 has a thickness ranging from 1 to 1.5 mil, preferably approximately 1.25 mil. Adhesive stratum 44 is cast from a thermosetting polyester or acrylic in ketone and/or toluol solution, preferably being applied to the clear film prior to superposing of the two polymeric films in the formation of the final product. The resulting film has a pleasant, soft grey color that permits excellent visibility.

As shown in FIG. 3, an aqueous detergent 52 is applied to pressure sensitive adhesive 50 in order to deactivate the pressure sensitive adhesive during application of solar control film 38 to a window 54. During superposition of the solar control film upon the window shown at 54, the aqueous detergent coat 52 serves as a lubricant to permit smoothing of the film and elimination of air pockets between the film and the window. Following application of the film to the window, the aqueous detergent diffuses through the edges of the interface between the film and the window and through the film itself. In order to facilitate this evaporation process, preferably all of the strata of the film are selected for their vapor permeability, the pressure sensitive adhesive stratum 50, in particular being vapor permeable but insoluble with respect to water. In other words, the detergent is polar and the pressure sensitive adhesive is non-polar. The detergent permeates toward the edges of the film glass laminate and also penetrates through the film by diffusion but without reaction with or solution into the pressure sensitive adhesive. The arrangement is such that a separate release sheet is eliminated. The silicone release stratum on the outside serves as a lubricant when the film is laid down with a squeegee 58 and also serves as a protective coating to prevent scratches when the film is washed after being laminated in place. The thin film vapor coating of aluminum stops solar radiation from passing through the glass so that much of the heat is gone before it can be absorbed by the glass itself. The mirror effect that reflects the suns rays outwardly also reflects artificial heat inwardly for lower winter heating costs.

FIG. 4 illustrates a roll of the sheeting of FIG. 1 with its release coating 50 at one face and its pressure sensitive coating 52 at the other face, coiled so that pressure sensitive adhesive stratum 52 is in contact with release stratum 53 for storage and transport. In an alternative embodiment, release coating 50 is omitted and a separate silicone release sheet is superposed on pressure sensitive adhesive stratum 52 until use. In another alternative embodiment, adhesive stratum 44 contains a colorant, preferably a dye, which results in an easily selected hue.

The present invention thus provides an improved solar control film that is less costly, can be more simply stored and transported, more easily applied to a window and more permanently used on interior or exterior window surfaces. Since certain changes may be made in the above disclosure without departing from the scope of the invention thereof, it is intended that all matters shown in the accompanying drawings or described in the foregoing specification be interpreted in an illustrative and not in a limiting sense.

What is claimed is:

1. A flexible solar control film sheet for adherence to a glass window, said solar control film comprising:
   a. a first polyester self-supporting stratum ranging in thickness from one-fourth mil to 1 mil, said first polyester self-supporting stratum being optically clear and transparent to visible light;
   b. a second polyester self-supporting stratum ranging in thickness from one-fourth to 1 mil, said second polyester self-supporting stratum being optically clear and transparent to visible light;
   c. an inner bonding stratum between the adjacent faces of said first polyester self-supporting stratum and said second polyester self-supporting stratum, said inner bonding stratum being composed of a polymer selected from the class consisting of polyesters and acrylate esters;
   d. a vapor deposited aluminum stratum on a face of one of said first self-supporting polyester stratum and said second self-supporting polyester stratum in contact with said bonding stratum, said vapor deposited aluminum stratum having a thickness of no more than 300 angstrom units and a visible light transmission ranging from 5 percent to 60 percent; and e. an outer adhesive stratum contacting one of the remote faces of said first self-supporting polyester stratum and said second self-supporting polyester stratum, said outer adhesive stratum being tacky;

f. said first polyester self-supporting stratum, said second polyester self-supporting stratum, said inner bonding stratum, and said vapor deposited aluminum stratum being moisture permeable;

g. at least one of said polyester self-supporting strata containing an ultraviolet light absorbing polymer effective in the range of 200 to 380 nanometers;

h. said inner bonding stratum ranging in thickness from 0.0001 to 0.0003 inch.

2. The flexible solar control film sheet of claim 1, wherein said outer adhesive stratum is composed of a mixture of natural and synthetic rubbers, a tackifier and an organic solvent.

* * * * *

UNITED STATES PATENT OFFICE
CERTIFICATE OF CORRECTION

Patent No. 3,775,226  Dated November 27, 1973

Inventor(s) Michael E. Willdorf

It is certified that error appears in the above-identified patent and that said Letters Patent are hereby corrected as shown below:

On page 1, line 2, cancel "Windorf" and insert--Willdorf--;

line 4, cancel "Windorf" and insert--Willdorf--.

Signed and Sealed this

Nineteenth Day of October 1976

[SEAL]

Attest:

RUTH C. MASON
Attesting Officer

C. MARSHALL DANN
Commissioner of Patents and Trademarks